(12) United States Patent
Vidojevic

(10) Patent No.: US 10,149,490 B2
(45) Date of Patent: Dec. 11, 2018

(54) AIR POPCORN POPPER

(71) Applicant: C. Cretors & Company, Chicago, IL (US)

(72) Inventor: Nenad Vidojevic, Chesterton, IN (US)

(73) Assignee: C. Cretors & Company, Wood Dale, IL (US)

( * ) Notice: Subject to any disclaimer, the term of this patent is extended or adjusted under 35 U.S.C. 154(b) by 468 days.

(21) Appl. No.: 13/866,981

(22) Filed: Apr. 19, 2013

(65) Prior Publication Data

US 2013/0276641 A1 Oct. 24, 2013

Related U.S. Application Data

(60) Provisional application No. 61/635,805, filed on Apr. 19, 2012.

(51) Int. Cl.
*A23L 1/18* (2006.01)
*A23L 7/187* (2016.01)

(52) U.S. Cl.
CPC ............. *A23L 1/1812* (2013.01); *A23L 7/187* (2016.08)

(58) Field of Classification Search
CPC .... A23L 1/1807; A23L 1/1812; A23L 1/1815; A23L 1/18; A23P 1/148; A47J 37/041; G07F 9/105; G07F 17/0078
USPC .......... 99/323.5–323.11; 219/389, 400, 429, 219/432, 433, 436, 438, 473, 479, 499, 219/506, 508
See application file for complete search history.

(56) References Cited

U.S. PATENT DOCUMENTS

| | | | |
|---|---|---|---|
| 1,251,291 A | 12/1917 | Scheeffer | |
| 1,436,400 A | 11/1922 | Mabey | |
| 1,477,704 A | 12/1923 | Holcomb et al. | |
| 1,501,114 A | 7/1924 | Howe | |
| 1,525,966 A * | 2/1925 | Vickers | 99/323.11 |
| 1,786,877 A | 12/1930 | Thompson | |
| 1,867,910 A | 7/1932 | Eakins | |
| 1,880,822 A * | 10/1932 | Cook et al. | 219/389 |
| 1,961,812 A | 6/1934 | Burch | |
| 1,987,388 A | 1/1935 | Cretors | |
| 2,123,663 A | 7/1938 | Roach | |
| 2,198,152 A | 6/1939 | Cooley | |
| 2,232,954 A | 2/1941 | Manley | |

(Continued)

FOREIGN PATENT DOCUMENTS

DE 8624682 12/1986
DE 20120429 7/2002

(Continued)

OTHER PUBLICATIONS

Proctor Companies; Equipment Catalog, 1992, (missing all even numbered pages) 33 pages.

(Continued)

*Primary Examiner* — Ibrahime A Abraham
*Assistant Examiner* — Biniam Asmelash
(74) *Attorney, Agent, or Firm* — Perkins Coie LLP

(57) ABSTRACT

Popcorn machines having fan assemblies and heat sources are described herein. The fan assemblies and the heat sources can be configured to provide heat to unpopped corn kernels to produce popcorn without the use of cooking oil. The popcorn machines can be configured for commercial use and can be mounted onto support structures that allow operators to rotate the popcorn machines.

22 Claims, 9 Drawing Sheets

(56) References Cited

U.S. PATENT DOCUMENTS

| | | | |
|---|---|---|---|
| 2,248,812 A | 7/1941 | Cretors | |
| 2,467,866 A * | 4/1949 | Smolderen | A47B 81/007 |
| | | | 141/375 |
| 2,477,416 A * | 7/1949 | Page | A23L 1/1815 |
| | | | 366/185 |
| 2,537,744 A * | 1/1951 | Cretors | 99/323.9 |
| 2,549,449 A | 4/1951 | Gibson | |
| 2,570,126 A | 10/1951 | Hobbs | |
| 2,575,643 A * | 11/1951 | Tamsen | A23L 7/191 |
| | | | 34/225 |
| 2,586,347 A | 2/1952 | Kloster | |
| 2,604,030 A | 7/1952 | Cretors | |
| 2,654,823 A | 10/1953 | Altemiller | |
| 2,721,510 A | 10/1955 | Caswell | |
| 2,812,704 A | 11/1957 | Hawks | |
| 2,856,841 A | 10/1958 | Cretors et al. | |
| 2,858,761 A | 11/1958 | Denniss | |
| 2,907,264 A | 10/1959 | Bushway | |
| 2,918,956 A | 12/1959 | Otto | |
| 2,939,379 A | 6/1960 | Schmitt | |
| 2,984,169 A | 5/1961 | Bushway | |
| 3,095,326 A | 6/1963 | Green et al. | |
| D196,811 S | 11/1963 | Lasar | |
| 3,120,168 A | 2/1964 | Lippert | |
| 3,140,952 A | 7/1964 | Cretors | |
| 3,156,451 A | 11/1964 | Waas | |
| 3,251,579 A | 5/1966 | Lasar | |
| 3,280,720 A | 10/1966 | Kuhn | |
| 3,291,304 A | 12/1966 | Fuchs | |
| 3,421,475 A | 1/1969 | Evans et al. | |
| 3,450,068 A | 6/1969 | Temple | |
| 3,512,989 A | 5/1970 | Smith | |
| 3,554,115 A | 1/1971 | Manley et al. | |
| 3,568,782 A | 3/1971 | Cox | |
| 3,650,199 A | 3/1972 | Sachnik | |
| 3,697,289 A | 10/1972 | Day et al. | |
| 3,739,953 A | 6/1973 | Cretors | |
| 3,751,267 A | 8/1973 | Sachnik | |
| 3,783,854 A | 1/1974 | Hurko et al. | |
| 3,930,996 A | 1/1976 | Day et al. | |
| 4,120,236 A | 10/1978 | Blomberg | |
| 4,152,974 A | 5/1979 | Tienor | |
| 4,165,620 A | 8/1979 | Gehauf et al. | |
| 4,173,925 A | 11/1979 | Leon | |
| 4,178,843 A | 12/1979 | Crabtree et al. | |
| 4,182,229 A | 1/1980 | VandeWalker | |
| 4,206,695 A | 6/1980 | Cretors | |
| 4,288,686 A | 9/1981 | Cretors | |
| 4,289,079 A * | 9/1981 | Swistun | 110/255 |
| 4,329,068 A | 5/1982 | Neuner et al. | |
| 4,331,124 A | 5/1982 | Seidel et al. | |
| 4,337,584 A * | 7/1982 | Johnson | F26B 17/124 |
| | | | 34/169 |
| 4,362,146 A | 12/1982 | Schuller | |
| 4,438,682 A | 3/1984 | King et al. | |
| 4,494,314 A * | 1/1985 | Gell, Jr. | 34/368 |
| 4,512,247 A * | 4/1985 | Friedman | A23G 3/26 |
| | | | 118/19 |
| D285,404 S | 9/1986 | Wang | |
| 4,648,719 A | 3/1987 | Roben et al. | |
| 4,649,263 A | 3/1987 | Goodlaxson | |
| 4,702,158 A * | 10/1987 | Ishihara | 99/323.5 |
| D294,448 S | 3/1988 | Otto | |
| 4,748,903 A | 6/1988 | Fereshetian | |
| 4,750,276 A | 6/1988 | Smith et al. | |
| 4,763,568 A | 8/1988 | Kiczek | |
| 4,881,457 A | 11/1989 | Lyga et al. | |
| 4,914,834 A | 4/1990 | Sime | |
| 5,033,363 A * | 7/1991 | King et al. | 99/323.7 |
| 5,035,173 A | 7/1991 | Stein et al. | |
| 5,046,481 A | 9/1991 | Warwick | |
| 5,069,923 A | 12/1991 | Hubbard et al. | |
| 5,083,505 A | 1/1992 | Kohlstrung et al. | |
| 5,154,161 A | 10/1992 | Rogers et al. | |
| 5,176,069 A * | 1/1993 | Chen | A47J 27/14 |
| | | | 366/144 |
| 5,180,898 A | 1/1993 | Alden et al. | |
| 5,203,256 A | 4/1993 | Mueller | |
| 5,263,405 A | 11/1993 | Simon | |
| 5,301,601 A | 4/1994 | Cretors | |
| 5,311,930 A | 5/1994 | Bruenn | |
| 5,315,919 A | 5/1994 | Hoeberigs | |
| 5,332,102 A | 7/1994 | Sennett et al. | |
| 5,339,726 A | 8/1994 | Poulson | |
| 5,397,219 A | 3/1995 | Cretors | |
| 5,417,148 A | 5/1995 | Cavallo | |
| 5,419,239 A | 5/1995 | Covington et al. | |
| 5,445,073 A | 8/1995 | Gilwood | |
| 5,501,139 A * | 3/1996 | Lee | 99/323.9 |
| 5,513,558 A | 5/1996 | Erickson et al. | |
| 5,539,671 A | 7/1996 | Albrecht et al. | |
| 5,555,792 A * | 9/1996 | Stein et al. | 99/323.9 |
| 5,579,681 A | 12/1996 | Ubert et al. | |
| 5,590,582 A | 1/1997 | Weiss | |
| 5,605,091 A | 2/1997 | Garber | |
| 5,662,024 A | 9/1997 | Cretors et al. | |
| D384,548 S | 10/1997 | Hsieh | |
| 5,690,018 A | 11/1997 | Hansen | |
| 5,694,830 A | 12/1997 | Hodgson et al. | |
| 5,699,720 A | 12/1997 | Stein et al. | |
| 5,743,172 A | 4/1998 | Weiss et al. | |
| 5,771,779 A | 6/1998 | Stein et al. | |
| 5,782,165 A | 7/1998 | Glenboski et al. | |
| 5,787,798 A | 8/1998 | Stein et al. | |
| 5,871,792 A | 2/1999 | Weiss et al. | |
| 5,979,301 A | 11/1999 | Perttola | |
| 6,000,318 A | 12/1999 | Weiss et al. | |
| 6,021,707 A | 2/2000 | Bauer et al. | |
| D426,422 S | 6/2000 | Otto | |
| 6,098,526 A | 8/2000 | Stein et al. | |
| 6,123,011 A | 9/2000 | Cretors | |
| 6,133,549 A | 10/2000 | Shih et al. | |
| 6,164,192 A | 12/2000 | Stein et al. | |
| 6,164,193 A | 12/2000 | Perttola | |
| 6,234,063 B1 | 5/2001 | Evers et al. | |
| 6,374,727 B1 | 4/2002 | Cretors | |
| 6,382,087 B1 | 5/2002 | Iiyama | |
| 6,412,395 B1 | 7/2002 | Weiss et al. | |
| 6,412,396 B1 | 7/2002 | Wright | |
| 6,460,451 B1 | 10/2002 | Helman et al. | |
| 6,461,033 B2 * | 10/2002 | Palmer | B01F 7/186 |
| | | | 366/185 |
| 6,534,103 B2 | 3/2003 | Weiss | |
| 6,578,468 B1 | 6/2003 | Horn | |
| 6,612,225 B1 | 9/2003 | Mann | |
| 6,669,304 B2 * | 12/2003 | Binning | 298/17.7 |
| 6,672,201 B2 | 1/2004 | Evans, Sr. et al. | |
| 6,872,923 B2 | 3/2005 | Cretors et al. | |
| 6,914,226 B2 | 7/2005 | Ottaway | |
| 7,024,986 B2 | 4/2006 | Kurosawa | |
| 7,082,891 B2 | 8/2006 | Watson | |
| 7,259,357 B2 | 8/2007 | Walker | |
| 7,285,300 B1 | 10/2007 | Allington et al. | |
| 7,846,493 B1 | 12/2010 | Cox | |
| 7,874,244 B1 | 1/2011 | Rhome | |
| 8,011,622 B1 * | 9/2011 | Guthrie | B65G 65/24 |
| | | | 224/164 |
| 8,201,492 B2 | 6/2012 | Cretors | |
| D672,789 S | 12/2012 | Bongiovanni | |
| 8,464,634 B2 | 6/2013 | Cretors et al. | |
| 8,651,014 B2 | 2/2014 | Vidojevic et al. | |
| 8,794,129 B2 | 8/2014 | Cretors | |
| 8,869,679 B2 | 10/2014 | Ryan et al. | |
| 9,144,247 B2 | 9/2015 | Cretors | |
| 9,408,496 B2 | 8/2016 | Cretors | |
| D802,982 S | 11/2017 | Vidojevic | |
| 2002/0034567 A1 | 3/2002 | Jacobsen et al. | |
| 2002/0147006 A1 | 10/2002 | Coon et al. | |
| 2003/0159591 A1 | 8/2003 | Evans et al. | |
| 2003/0168438 A1 | 9/2003 | Zhou | |
| 2004/0026404 A1 | 2/2004 | Lerner | |
| 2004/0045444 A1 * | 3/2004 | Mann | 99/323.5 |
| 2004/0074397 A1 * | 4/2004 | Calhoun | 99/323.5 |

(56) References Cited

U.S. PATENT DOCUMENTS

| | | | |
|---|---|---|---|
| 2004/0265993 | A1 | 12/2004 | Darling et al. |
| 2005/0056154 | A1 | 3/2005 | Fu |
| 2005/0086814 | A1 | 4/2005 | Huang |
| 2006/0149415 | A1 | 7/2006 | Richards |
| 2009/0041915 | A1 | 2/2009 | Biechteler |
| 2009/0056558 | A1* | 3/2009 | Cretors et al. ............... 99/323.8 |
| 2009/0126579 | A1 | 5/2009 | Cretors et al. |
| 2009/0145242 | A1 | 6/2009 | Pryor, Jr. et al. |
| 2009/0208621 | A1 | 8/2009 | Dotan |
| 2009/0223378 | A1* | 9/2009 | Cretors ...................... 99/323.5 |
| 2010/0270282 | A1 | 10/2010 | Fernandez et al. |
| 2011/0014340 | A1 | 1/2011 | Spitzley et al. |
| 2011/0027434 | A1 | 2/2011 | Cretors |
| 2011/0076372 | A1* | 3/2011 | Cretors ...................... 426/450 |
| 2011/0076373 | A1 | 3/2011 | Cretors et al. |
| 2011/0083562 | A1 | 4/2011 | Ryan et al. |
| 2011/0200727 | A1 | 8/2011 | Biechteler |
| 2012/0266756 | A1 | 10/2012 | Cretors |
| 2013/0022727 | A1* | 1/2013 | Sherwin ...................... 426/523 |
| 2013/0276640 | A1 | 10/2013 | Cretors |
| 2013/0280386 | A1 | 10/2013 | Cretors |
| 2015/0064320 | A1 | 3/2015 | Cretors |
| 2017/0290360 | A1 | 10/2017 | Vidojevic |

FOREIGN PATENT DOCUMENTS

| | | | |
|---|---|---|---|
| EP | 0364071 | | 4/1990 |
| FR | 2401387 | | 3/1979 |
| GB | 0688223 | | 3/1953 |
| GB | 717654 | A | 10/1954 |
| JP | 59135849 | A * | 8/1984 |
| JP | 2006081587 | A | 3/2006 |
| WO | WO-9310698 | | 6/1993 |
| WO | WO-9706699 | | 2/1997 |
| WO | WO-2004054384 | | 7/2004 |
| WO | WO-2012145717 | | 10/2012 |

OTHER PUBLICATIONS

International Search Report and Written Opinion dated Aug. 9, 2013 for Application No. PCT/US2013/037488; C. Cretors & Company; 9 pages.

Cretors Coater Mixer Tumbler, http://www.cretors.com/store/catalog.asp?item=39&category_id=3, Copyright 2014, 1 page.

International Search Report and Written Opinion for PCT/US2008/075083; dated Nov. 12, 2008; Applicant: C. Cretors and Company, 8 pages.

International Search Report and Written Opinion; PCT/EP05/009010, dated Jan. 5, 2006, Applicant: Pfister and Pfister, 6 pages.

International Search Report and Written Opinion; PCT/US10/50442, dated Nov. 23, 2010, Applicant: C. Cretors & Company, 10 pages.

Suspended Poppers: 20 oz., 32 oz., 48 oz., 60 oz., C. Cretors and Company, published Nov. 2004, 6 pages.

Topping & Dispensing Systems, C. Cretors and Company Product Brochure, pp. 36-39, published Oct. 2005, 5 pages.

Topping Systems, C. Cretors and Company, published Nov. 2003, 2 pages.

C. Cretors and Co., "Diplomat" product manual for models DI20C, DI32C, DI20F, DI32F, DI205, TDI205, TDI206, DI325 and TDI326; 1996, 58 pages.

C. Cretors and Co., "Diplomat" product manual for models DI20CP, DI32CP, DI20FP and DI32FP; 1989, 62 pages.

C. Cretors and Co., Multi-product sell sheet for "The New Diplomat Counter Showcase" and "Thunder Kettle" for models G48E, EPR48E5 and PR48E5; dated 1990, 2 pages.

Gold Medal Products Co., "Funfood Equipment & Supplies" catalog; vol. 56, dated 2000, 108 pages.

Loeb Equipment 20 Gallon Groen Model DNTA20 Twin Scrape Agitated Jacketed Kettle; www.loebequipment.com, Oct. 31, 2011, 1 page.

Proctor Companies; "Concession Stands and Equipment" catalog, vol. 3, 1996, 84 pages.

Proctor Companies; Equipment Catalog, 1992, 33 pages.

International Search Report and Written Opinion, PCT/US2012/03459, dated Sep. 20, 2012, 7 pages.

"How to Succeed in the Caramel Corn Business," Gold Medal Products Company, Copyright 2011, gmpopcorn.com, 24 pages.

Notice of Allowance received for co-pending U.S. Appl. No. 29/572,543, filed Jul. 28, 2016, Applicant: Cretors, Inc., dated Sep. 1, 2017, 17 pages.

Notice of Allowance received for co-pending U.S. Appl. No. 29/572,543, filed Jul. 28, 2016, Applicant: Cretors, Inc., dated Jul. 11, 2017, 8 pages.

* cited by examiner

AIR POPCORN POPPER

CROSS-REFERENCE TO RELATED APPLICATION

This patent application claims the benefit under 35 U.S.C. § 119 of U.S. Provisional Patent Application Ser. No. 61/635,805; filed Apr. 19, 2012; and titled "AIR POPCORN POPPER," the disclosure of which is incorporated herein by reference in its entirety.

TECHNICAL FIELD

The following disclosure relates generally to commercial popcorn machines utilizing heated air to pop corn kernels and associated devices and methods.

BACKGROUND

Commercial popcorn vendors typically employ popcorn machines that heat unpopped kernels in a bath of oil. The resulting popcorn can retain a significant portion of the cooking oils, leading to increased oil consumption by consumers who eat popcorn prepared this way. This comes as nutritional experts have increasingly recommended that foods high in fat be reduced or even eliminated from one's diet. Furthermore, without added oils, popcorn can be a very nutritional food, as it contains relatively high levels of fiber and antioxidants.

Air popping corn kernels is one method of applying a sufficient amount of heat to unpopped kernels to produce popcorn without the use of added oils. However, typical consumer air popping machines are designed for home use and are not robust or large enough for commercial use (e.g. in a concession stand). Moreover, typical air popping machines lack the ability regulate the heat applied to the corn kernels (e.g., by controlling an amount of current supplied to a heating element, an amount of airflow into the popping machine, etc.) to compensate for variations in, for example, corn kernel varieties and/or ambient conditions. There exists a need for a commercial-grade air popping machine with a temperature and/or airflow intake adjustment capability.

DETAILED DESCRIPTION

Figure 1A:
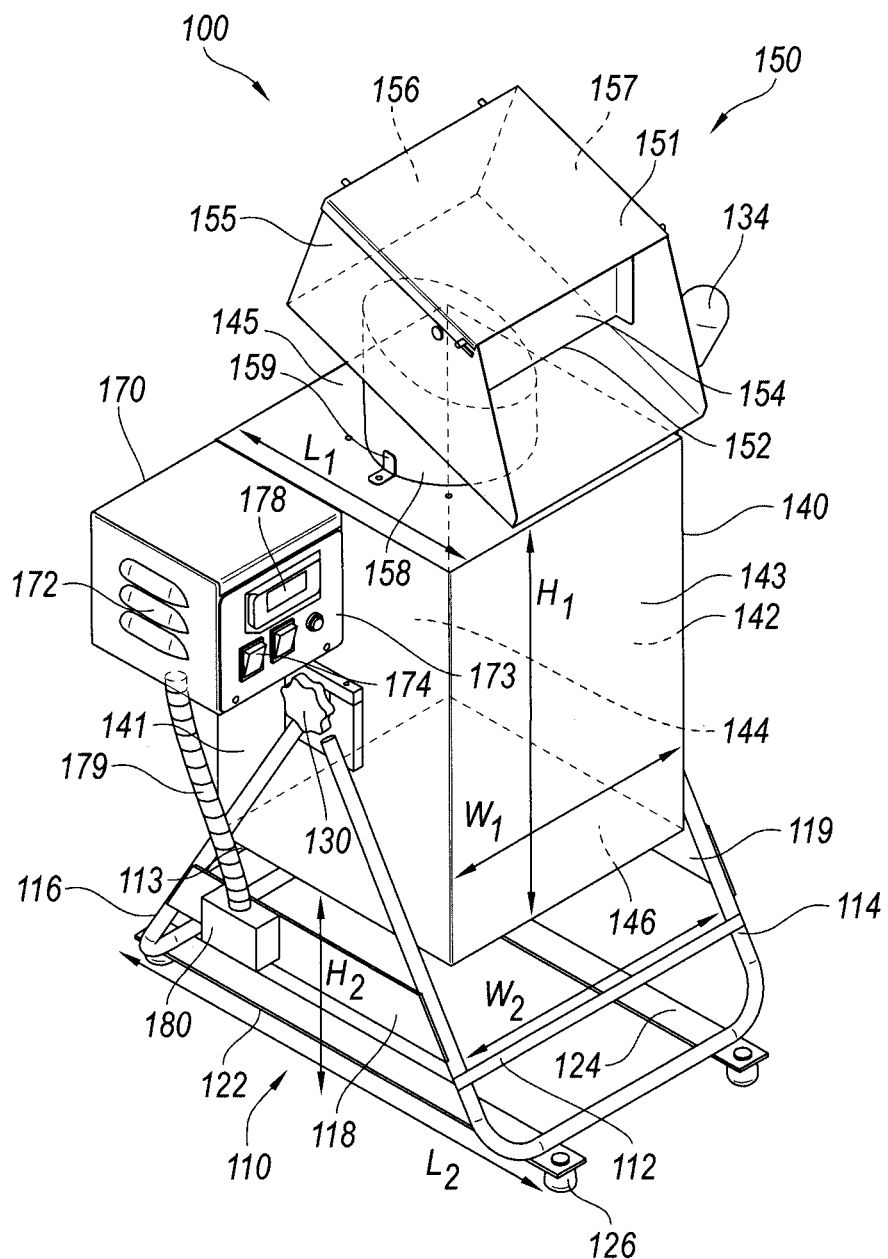
FIGS. 1A and 1B are a front isometric view and a front view, respectively, of a popcorn machine configured in accordance with an embodiment of the present disclosure.

The following disclosure describes various embodiments of air popping popcorn machines and associated devices and methods. Certain details are set forth in the following description and in FIGS. 1A-6 to provide a thorough understanding of various embodiments of the disclosure. Those of ordinary skill in the relevant art will appreciate, however, that the technology disclosed herein can have additional embodiments that may be practiced without several of the details described below and/or with additional features not described below. In addition, some well-known structures and systems often associated with popcorn machines and methods of making popcorn have not been shown or described in detail below to avoid unnecessarily obscuring the description of the various embodiments of the disclosure.

The dimensions, angles, features, and other specifications shown in the figures are merely illustrative of particular embodiments of the disclosure. Accordingly, other embodiments can have other dimensions, angles, features, and other specifications without departing from the scope of the present disclosure. In the drawings, identical reference numbers identify identical, or at least generally similar, elements.

Figure 1B:
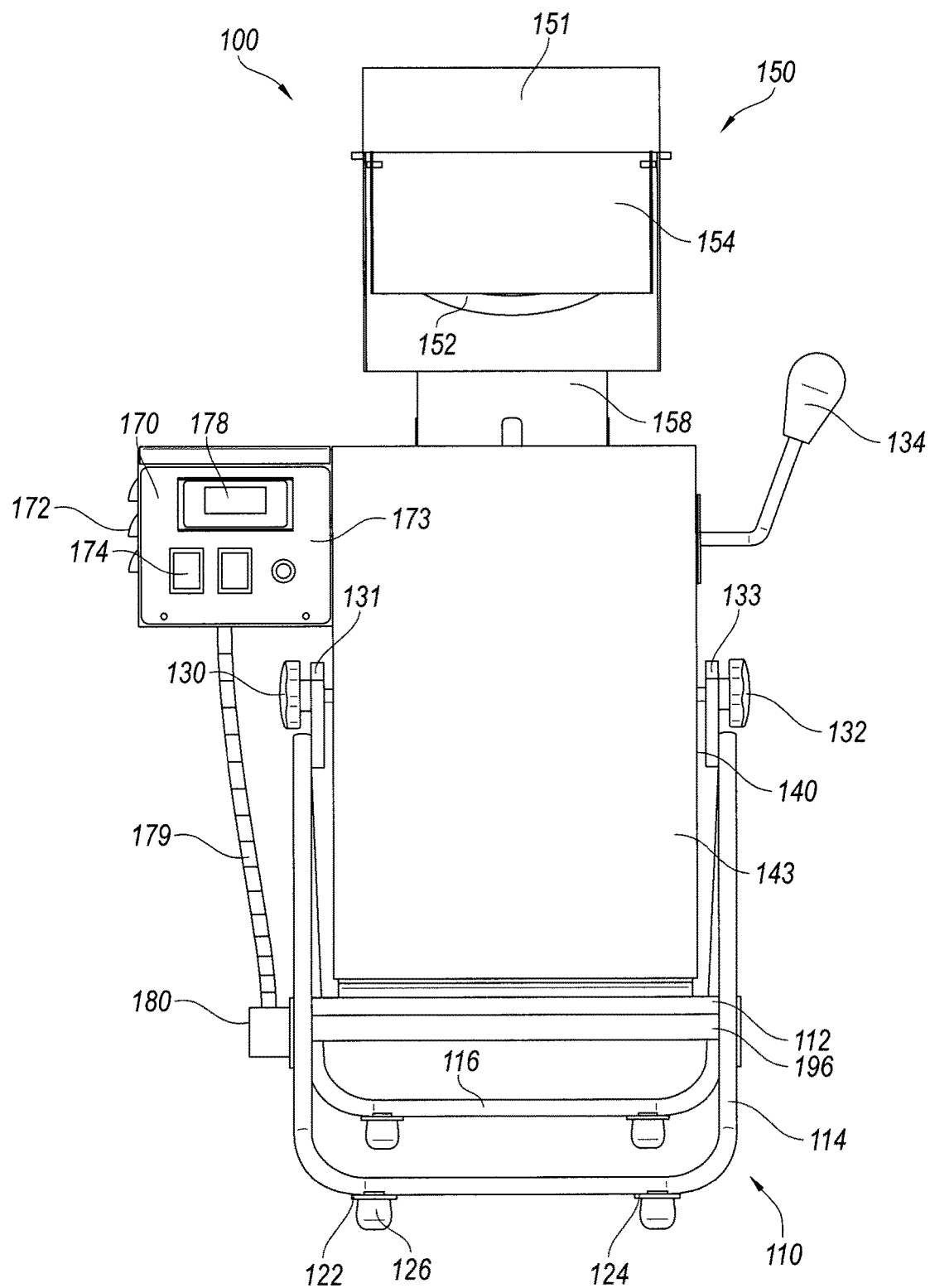

FIGS. 1A and 1B are a front isometric view and a front view, respectively, of a popcorn machine 100 configured in accordance with the present disclosure. Referring to FIGS. 1A and 1B together, in the illustrated embodiment, many features of the popcorn machine 100 can be at least generally similar in structure and function to corresponding features to similar popcorn machines described in U.S. application Ser. No. 12/890,370, which is incorporated herein in its entirety by reference. The popcorn machine 100 includes a shell or cabinet 140 that houses an air heating assembly (discussed in more detail below with reference to FIGS. 4A and 4B), a support structure or frame 110, a lid assembly or cover 150, and an electrical control unit 170.

The cabinet 140 can be made from any suitable durable, heat-resistant material (e.g. sheet metal, such as aluminum, stainless steel, etc.) and can include a pair of opposing side walls 141 and 142, a front wall 143 opposite a removable rear panel 144, and a top wall 145 opposing a bottom wall 146. In the illustrated embodiment, the front wall 143 and rear panel 144 have a height $H_1$ (e.g., 10 inches to 24 inches, or approximately 15 inches) and a width $W_1$ (e.g., 8 inches to 20 inches, or approximately 12 inches). The side walls 141 and 142 have a length $L_1$ (e.g., 8 inches to 20 inches, or approximately 12 inches) and height $H_1$. The top wall 145 and the bottom wall 146 have a length approximately equal to $L_1$ and a height approximately equal to $H_1$. In other embodiments, however, $H_1$, $W_1$ and $L_1$ can include any suitable dimension. Moreover, in the illustrated embodiment, the cabinet 140 has a generally rectangular shape, but in other embodiments, the cabinet 140 may have any suitable shape (e.g. a cube, a trapezoidal solid, and/or a sphere).

The frame 110 is configured to support the cabinet at a height $H_2$ (e.g., 5 inches to 15 inches, or approximately 8 inches) and includes two U-shaped support structures 114 and 116 fixedly attached to one another by a pair of junction plates 131 and 133, a pair of side braces 118 and 119, and a pair of support rails 122 and 124 having a length $L_2$ (e.g., 10 inches to 30 inches, or approximately 18 inches). A front crossbar 112 and an opposing rear crossbar 113 extend a width $W_2$ (e.g., 8 inches to 16 inches, or approximately 12 inches) across the support structures 114 and 116, respectively, to limit rotation of the cabinet 140. In some embodiments, however, $H_2$ and $W_2$ can include any suitable dimension. Moreover, in the illustrated embodiment, the support rails 122 and 124 rest on one or more feet 126. In other embodiments, the support rails 122 and 124 may rest on, for example, casters, height-adjustable legs, etc.

The frame 110 is coupled to the cabinet 140 by a pair of operable bearings 130 and 132. In the illustrated embodiment, the bearings 130 and 132 each include a knob rigidly attached to an end portion (e.g., a threaded rod). The bearings 130 and 132 are inserted through the junction plates 131 and 133, respectively, into receptacles (e.g. threaded holes, through holes, etc.) in the side walls 141 and 142, respectively configured to receive the bearings 130 and 132. An operator may, for example, turn the respective knobs of the bearings 130 and 132 to adjust the degree by which the junction plates 131 and 133, respectively, press against the respective side walls 141 and 142 to apply friction thereto. Loosening the bearings 130 and 132, for example, can allow the cabinet 140 to pivot about the bearings 130 and 132 and rotate forward when an operator, for example, pulls downwardly on a handle 134 attached to the side wall 142. Conversely, tightening the bearings 130 and 132 can press the junction plates 131 and 133 against the side walls 141 and 143, thereby restricting the ability of the cabinet 140 to rotate. In some embodiments, an operator may loosen and/or tighten the bearings 130 and 132 using, for example, nuts inserted onto the end portions of the bearings 130 and 132. An L-shaped bracket or bumper 196 is fixedly attached to an underside surface of the bottom wall 146 to limit rotation of the cabinet 140 from the orientation shown in FIGS. 1A and 1B. The rotational operation of the popcorn machine 100 is discussed in more detail below with reference to FIG. 6.

In the illustrated embodiment of FIGS. 1A and 1B, the frame 110 can be a base structure supporting the cabinet 140. However, in other embodiments, the cabinet 140 can be similarly supported from other structures by a frame in other orientations. For example, in some embodiments, the frame 110 can be configured to be mounted, for example, in a housing or cabinet, and/or on one or more side walls or ceiling thereof, to allow the cabinet 140 to rotate during operation as explained above.

The cover 150 includes a lid 151, an opening 152, a pivotable shield 154, and a duct 158 fixedly attached to the top wall 145 by one or more fasteners 159. The cover 150 also includes a pair of opposing side panels 155 and 157 and a rear panel 156. During operation, an operator loads the popcorn machine 100 by pouring unpopped kernels through the opening 152, the duct 158, and into a popcorn holding area (discussed in detail below with reference to FIG. 3). The explosive nature of an unpopped kernel becoming a piece of popcorn can cause other unpopped kernels and popcorn to fly wildly and unpredictably. The shield 154, however, which hangs pendant from the top of the opening 152, helps to contain the unpopped kernels and popcorn within the popcorn machine 100 during popping operation until a bed of popped kernels expands through the opening 152 and pushes out of the cover 150 past the shield 154.

An electrical box or control unit 170 having one or more vents 172 is disposed on the side wall 141. The control unit 170 can include a control panel 173 having one or more controls 174 (e.g. buttons, switches, knobs, etc.) and one or more displays 178 (e.g., light emitting diodes (LEDs), liquid crystal displays (LCDs), touchscreen displays, etc.). The control unit 170 is electrically coupled to a power input box 180 via a conduit 179. The power input box 180 can receive external electrical power from a power cord (not shown) plugged into a power source to provide electrical power to the control unit 170.

A user can operate various components of the popcorn machine 100 via the control panel 173. For example, in operation, a user can press a Start Button when the user is ready to begin heating of unpopped corn kernels. Pressing the Start Button can initiate a variety of functions on the popcorn machine 100. For example, as discussed in more detail with reference to FIG. 4A, one or more heating elements can be energized and a fan can be activated to begin heating the corn kernels. The control unit 170 can also be configured to automatically complete various operations of the popcorn machine 100. For example, the control unit 170 can adjust the power to the one or more heating elements after a predetermined amount of time and/or when a predetermined temperature has been reached (e.g., as measured by a thermocouple). The control unit 170 can also, for example, provide an indication on the display 178 that a popping cycle is complete. In some embodiments, for example, the control unit 170 can also adjust a temperature in response to user input. For example, the user can choose a popping cycle and/or temperature based on a list of popcorn varieties that the control unit 170 presents to the user via the display 178. Based on a selected variety of popcorn and a measured temperature, the control unit 170 can adjust an amount of power to the heating element accordingly to provide sufficient heat to the unpopped kernels.

Figure 2A:
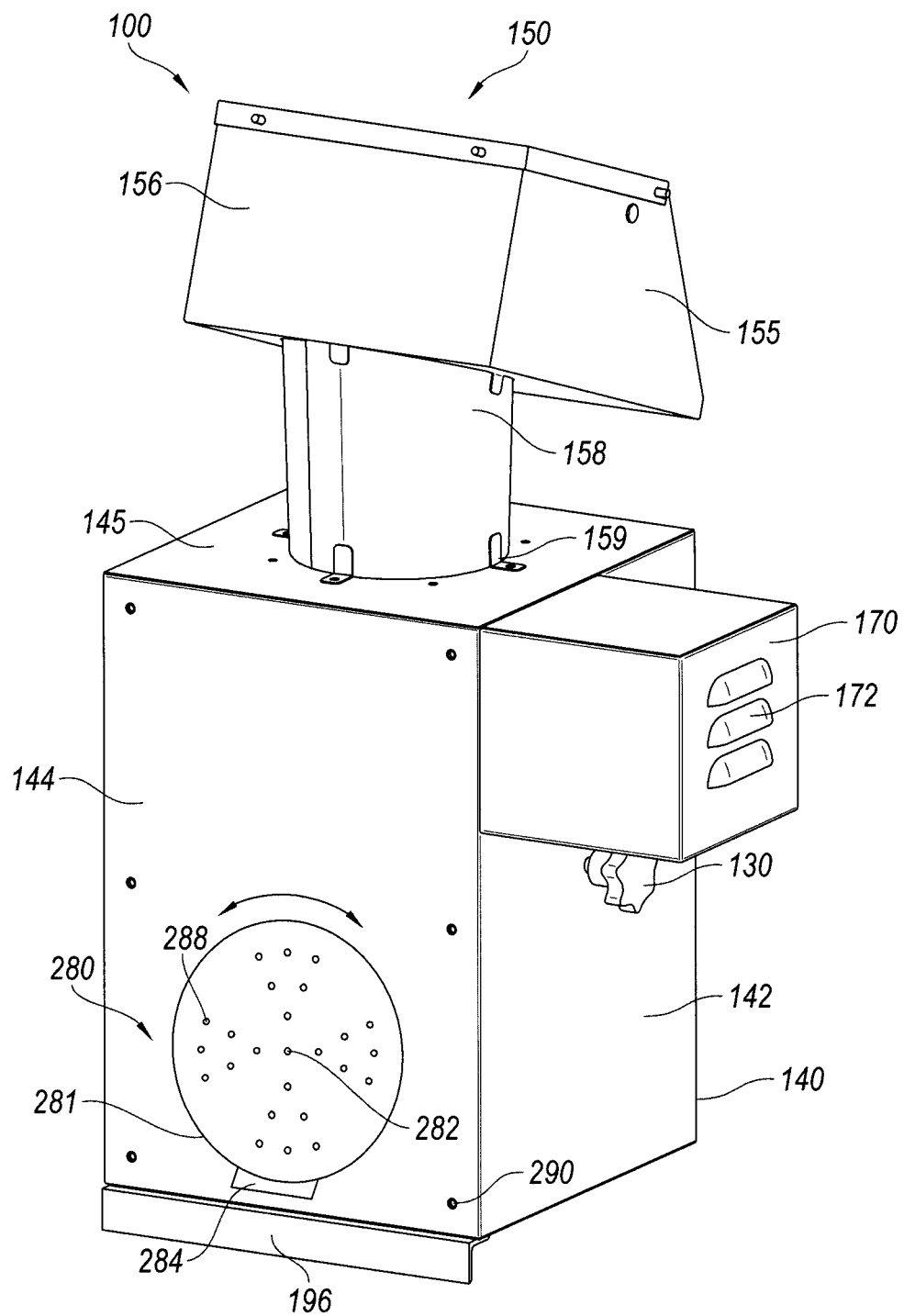
FIGS. 2A and 2B are rear isometric views of the popcorn machine of FIGS. 1A and 1B configured in accordance with an embodiment of the present disclosure.
Figure 2B:
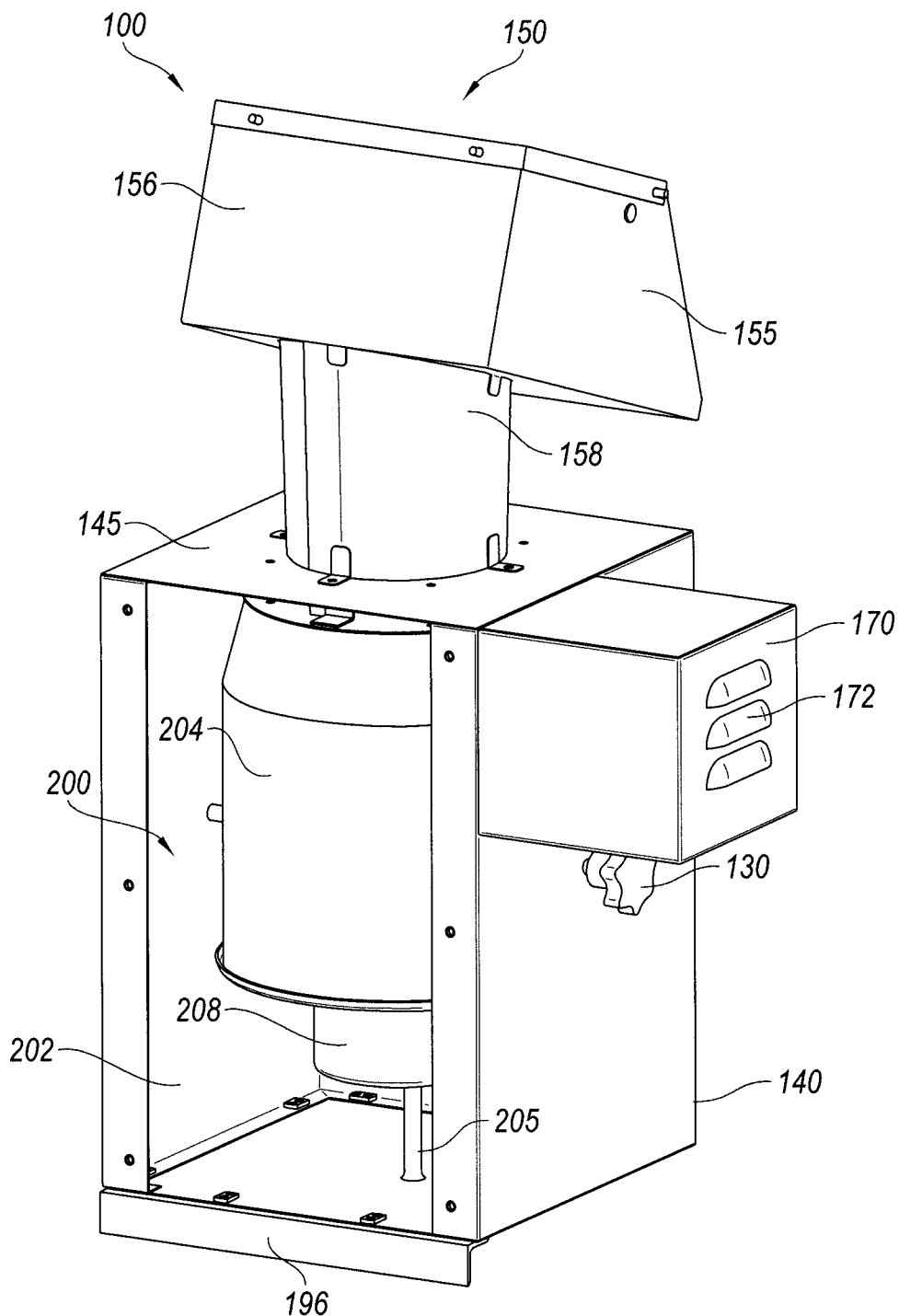

FIGS. 2A and 2B are rear isometric views of the popcorn machine 100 with the rear panel 144 attached and removed, respectively. In FIG. 2A, the rear panel 144 is removably attached to the cabinet 140 by one or more rear panel fasteners 290 (e.g., screws, clips, bolts, etc.) An air inlet 280 can include, for example, an air intake regulator or rotatable metal disc 281. The disc 281 includes a plurality of apertures 288 and can rotate about a spindle 282 when force is applied to a handle 284 (e.g., by an operator). A portion of the rear panel behind the disc 281 can have, for example, inlet holes generally similar in size and pattern as the apertures 288. Rotation of the disc 281 can regulate the amount of air drawn through the inlet 280 into an interior cavity 202 (FIG. 2B) of the cabinet 140 by adjusting a percentage of the surface area of the inlet holes of the rear panel open to external airflow. As those of ordinary skill in the art would appreciate, an increase in the open area of the inlet holes is generally proportional to an increase in the amount of heat that the popcorn machine 100 can produce. In some embodiments, for example, air intake regulation may be performed by another device other than the disc 281. For example, an operable louver, a damper, and/or a slidable shutter may be employed in and/or on the inlet 280 instead of the disc 281.

Referring to FIG. 2B, the cavity 202 is an interior space inside of the cabinet 140 in which an air heating assembly 200 is positioned. As explained in more detail below with reference to FIGS. 4A and 4B, the air heating assembly 200 includes a motor 208 coupled to a fan (not shown) surrounded by a protective cover or shroud 204 and supported by one or more legs 205. The air heating assembly 200 is configured to draw in air from the surrounding airspace into the cavity 202 and heat the air to a sufficient temperature to heat unpopped kernels to produce popcorn.

Figure 3:
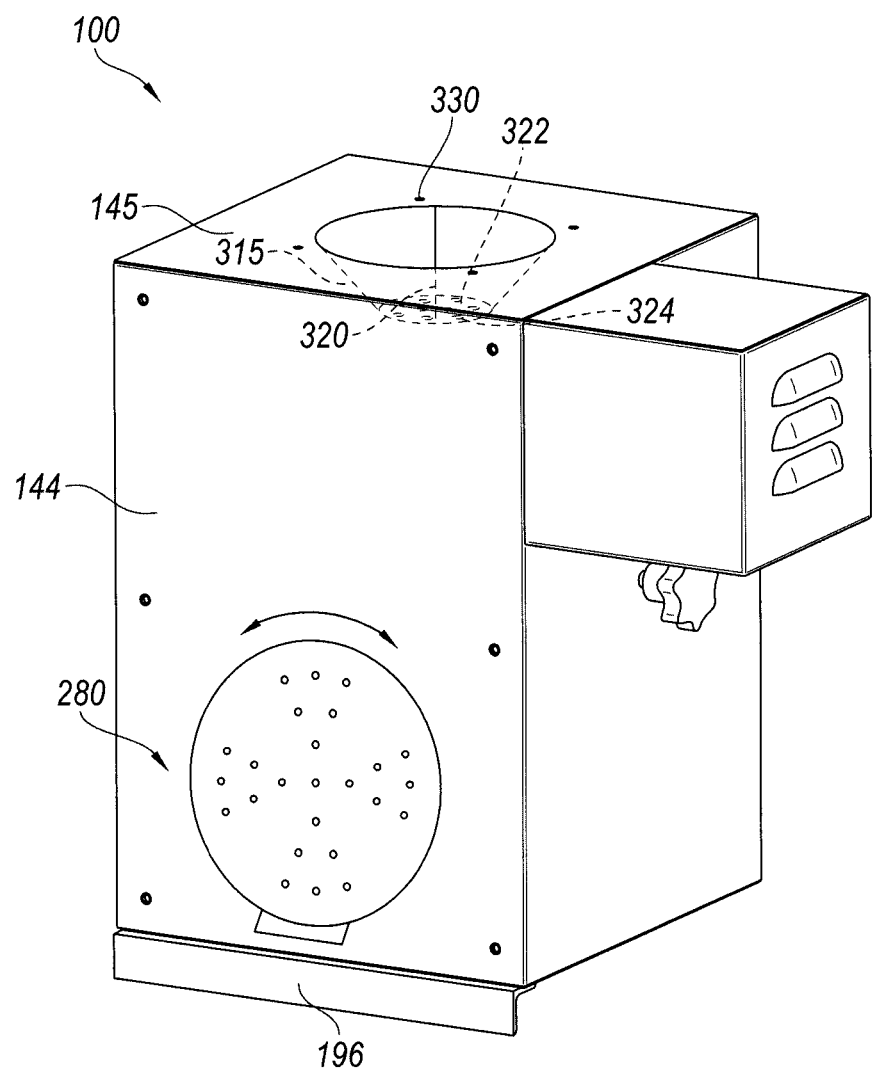
FIG. 3 is a rear isometric view of the popcorn machine of FIGS. 1A and 1B with a cover assembly removed for clarity in accordance with an embodiment of the present disclosure.

FIG. 3 is a rear isometric view of the popcorn machine 100 with the cover 150 removed, configured in accordance with an embodiment of the present disclosure. In the illustrated embodiment, a kernel holding area, receptacle or bowl 320 extends downward from an opening 315 in the top wall 145. The bowl 320 includes a base portion 322 having a plurality of apertures 324 therein. A plurality of holes 330 in the top wall 145 can each receive one of the fasteners 159 to facilitate attachment of the duct 158 to the cabinet 140 (FIG. 1A). During operation of the popcorn machine 100, a user inserts unpopped kernels into the cover 150 (not shown). The unpopped kernels are deposited in and/or on the bowl 320. The user may then activate the air heating assembly 200 to produce and discharge heated air through the apertures 324 in the bowl 320, thereby heating the unpopped kernels. If and/or when the air heating assembly 200 produces air having a sufficient temperature (e.g. 400-460 degrees Fahrenheit or 200-240 degrees Celsius), the popcorn machine 100 can heat the unpopped kernels to produce popcorn. The popcorn can then exit the popping machine via the opening 152 in the cover 150 (FIGS. 1A and 1B).

Figure 4A:
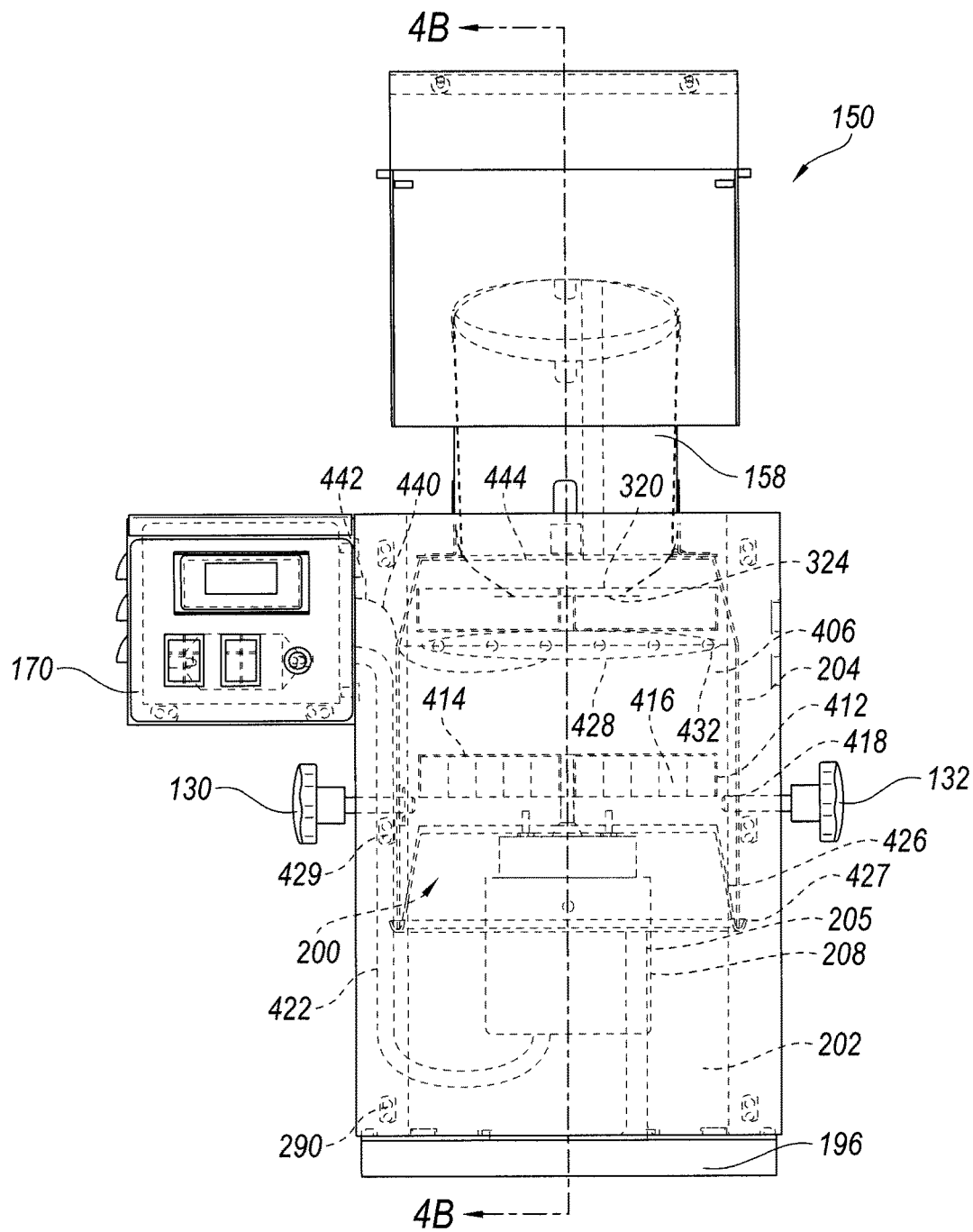
FIG. 4A is a detail front view of the popcorn machine of FIG. 1B, configured in accordance with an embodiment of the present disclosure.
Figure 4B:
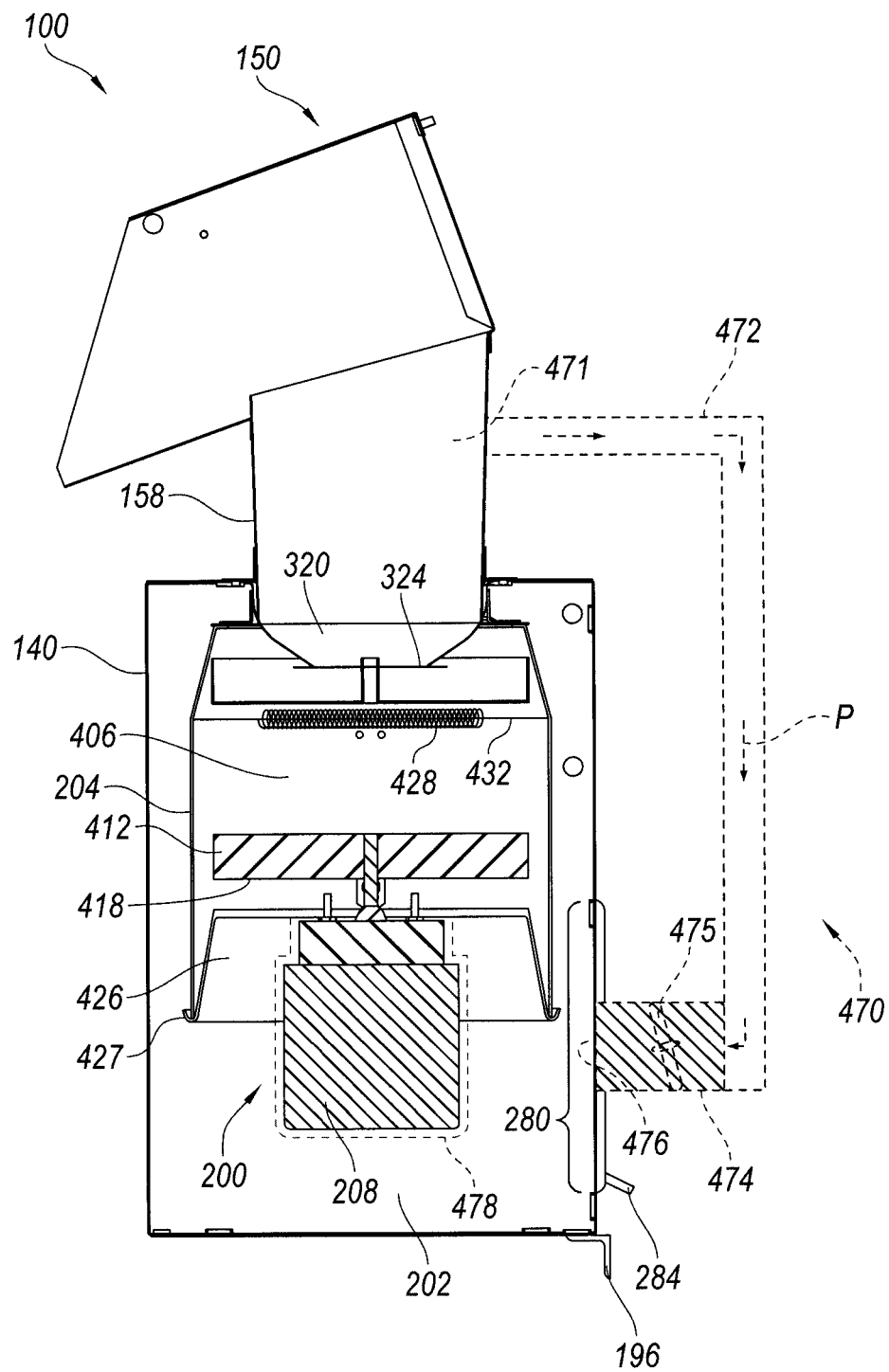
FIG. 4B is a cross-sectional side view of the popcorn machine of FIG. 4A, configured in accordance with an embodiment of the present disclosure.

FIG. 4A is a detail view of the popcorn machine 100, configured in accordance with an embodiment of the present disclosure. FIG. 4B is a cross-sectional side view of FIG. 4A along the denoted 4B line in FIG. 4A. In the illustrated embodiment of FIGS. 4A and 4B, the motor 208 is electrically coupled to the control unit 170 via one or more wires 422, configured to transmit, for example, electrical power and/or control signals. An upper portion of the motor 208 is at least partially surrounded by a circular inner base 426, which includes a circular lip 427 (FIG. 4B) on which the shroud 204 may rest. The inner base 426 further includes a top surface or fan support 429 configured to support an air mover or fan 412 thereon. A spindle 418 rotationally couples the fan 412 to the motor 208. In the embodiment of FIG. 4A, the fan 412 is a centrifugal fan having a plurality of blades 414 circumferentially arranged to form a plurality of fan outlets 416. In other embodiments, however, the fan 412 may be any suitable fan and/or air mover (e.g., an axial fan).

A heat element 428 is fixedly attached to an upper portion of the shroud 204 and is configured to be placed within the cavity at least proximate to an underside surface of the base portion 322 of the bowl 320 (FIG. 3). As described in more detail below with reference to FIG. 5, the heat element 428 can include one or more coils 432 configured produce heat when an electric current is applied therethrough. The heat element 428 can be electrically coupled to the control unit 170 by one or more wires 440, which can be configured to provide, for example, electrical power and/or control signals to the heat element 428.

Upon activation (e.g., when a user depresses a Start button on the control unit 170), the control unit 170 can supply electric power to the heat element 428 and the motor 208. As the motor 208 drives the fan 412 via the spindle 418, air is drawn through a center opening in the underside of the fan 412 (not shown) and discharged through the fan outlets 416 into a fan cavity 406 surrounded by the shroud 204. The discharged air flows upwardly in the fan cavity 406 and through the heat element 428. The heated air further flows into the bowl 320 before continuing out of the popcorn machine 100 through the cover 150. A wire 442 can electrically couple a thermocouple 444 disposed in and/or on the bowl 320 to the control unit 170. The thermocouple 444 can provide, for example, temperature data to be shown on display 178. A protective cover or motor shroud 478 may be employed to at least partially protect and/or insulate the motor 208 from the heat of the incoming recirculated air.

In some embodiments, for example, the popcorn machine 100 can include a recirculating system 470 configured to recover heat from air escaping the popcorn machine 100 via the cover 150 (e.g., through the use of a heat exchanger) and/or reuse the escaping heated air. Reusing escaping air may offer several advantages, such as, for example, reducing the amount of electrical energy needed to heat air in the popcorn popper and reducing the amount of heated air discharged in the space surrounding the popcorn machine 100. In the illustrated embodiment of FIG. 4B, for example, an outlet 471 in a rear portion of the duct 158 can be coupled to the air inlet 280 via a recirculation duct 472. In some embodiments, a fan assembly 474 including a fan 475 can be disposed at least proximate the inlet 280 to draw escaping air along a path P into the cavity 202 of the cabinet 140 via an outlet 476. For ease of reference, the duct 158 and the recirculation duct 472 may also be referred to as a first duct 158 and a second duct 472, respectively, and the fan 412 and the fan 475 may also be referred to as a first fan 412 and a second fan 475, respectively. In other embodiments, however, the fan assembly 474 may be installed in another suitable position on the cabinet 140. The fan assembly 474 can include, for example, one or more filters to remove, for example, byproducts of corn popping operations from the reused air.

In some other embodiments, however, the recirculation system 470 may include the recirculation duct 472 without the fan assembly 474 and the fan 475. In one or more of these embodiments, for example, a pressure differential between a first pressure (e.g., an ambient pressure, standard atmospheric pressure, etc.) at the outlet 471 popper and a second pressure (e.g., a negative pressure less than the ambient pressure) at the inlet 280 can cause at least a portion of air escaping the cover 150 to flow into the duct 472 and into the cavity 202 toward the fan 412. Accordingly a portion of the heated air that may be typically discharged from the machine 100 can be returned to the fan 412, thereby reclaiming at least a portion of the heat previously produced by, for example, the heat element 428.

Figure 5:
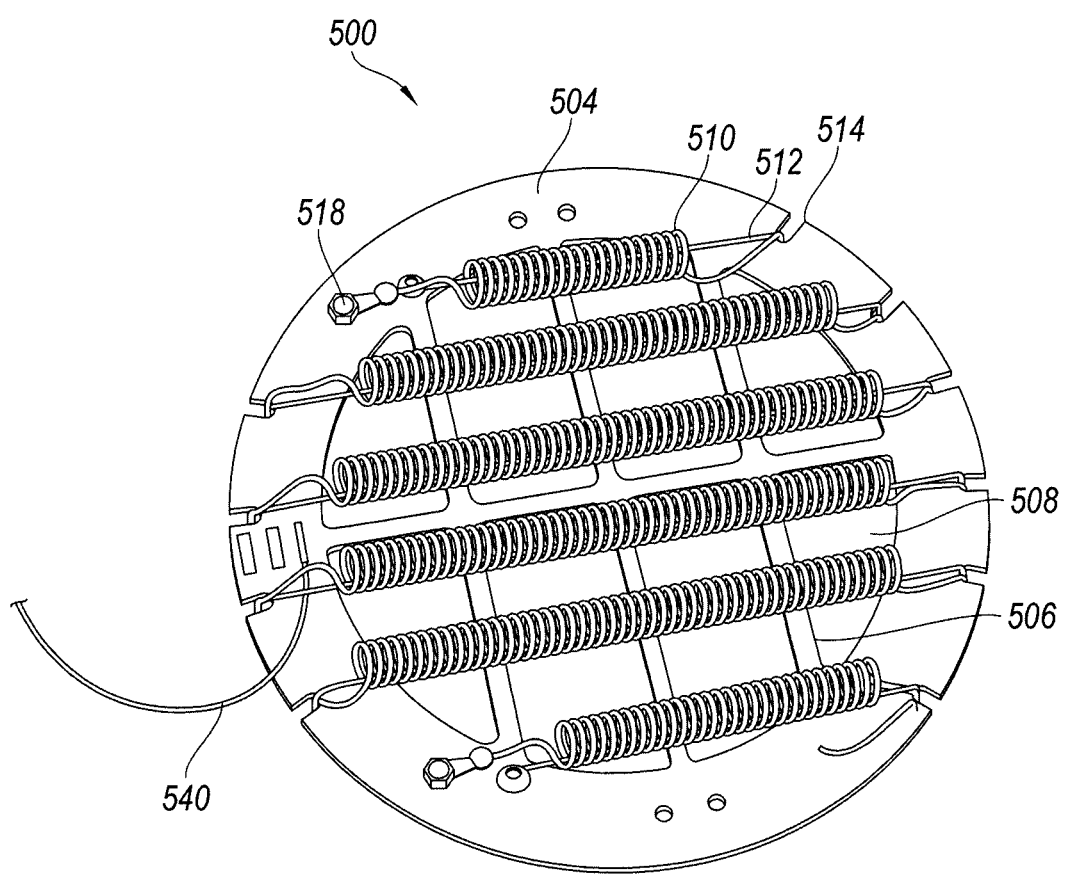
FIG. 5 is an isometric view of a heating element configured in accordance with an embodiment of the present disclosure.

FIG. 5 is an isometric view of a heating element 500, configured in accordance with an embodiment of the present disclosure. The heating element 500 includes a metal plate 504 having a grid 506 supporting one or more metal coils 510. In the illustrated embodiment, the grid 506 includes one or more open areas or gaps 508 through which air may flow during operation of the popcorn machine 100. The coils 510 may be fixedly attached to the heating element by at least one end by a hook 514 attached at one of a plurality of notches 512 in the metal plate 504. The coils 510 may also be attached to the metal plate 504 by a fastener 518 (e.g. a screw, a clip, etc.). A lead or wire 540 electrically couples the heating element to the control unit 170 (FIGS. 1A and 1B) to provide, for example, electrical power to the heating element 500. During operation of the popcorn machine 100, the fan 412 (FIGS. 4A and 4B) discharges air, which flows through the heating element 500 and is heated by the coils 510. If a sufficient amount of heat (e.g. 400-460 degrees Fahrenheit) is produced by the heating element 500, unpopped kernels in the bowl 320 may begin to pop, thereby producing popcorn.

Figure 6:
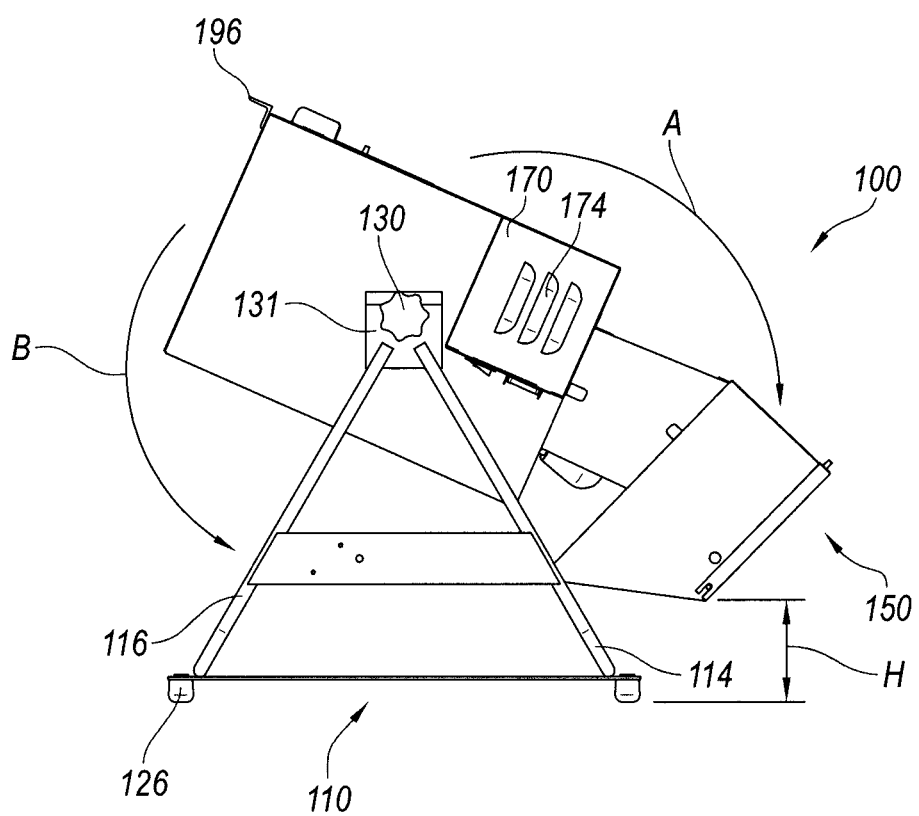
FIG. 6 is a side view of the popcorn machine of FIGS. 1A and 1B illustrating a mode of operation in accordance with an embodiment of the present disclosure.

FIG. 6 is a side view of the popcorn machine 100 showing rotational operation thereof. The popcorn machine 100 is shown in FIG. 6 after forward rotation in the direction of arrow A caused by, for example, an operator downwardly pulling the handle 134. The cover 150 is configured to engage the front crossbar 112 to limit forward rotation of the popcorn machine 100 such that the cover 150 is generally at least a height H above the floor on which the popcorn machine 100 is placed. The operator may wish to rotate the popcorn machine 100 forward as shown in FIG. 6, for example, to empty the popcorn machine 100 of unpopped kernels and/or other byproducts of the corn popping process. The operator can restore the popcorn machine 100 to its standard upright orientation by pulling upward on the handle 134, thereby moving the popcorn machine 100 in the direction of arrow B until the bumper 196 engages the rear crossbar 113.

As explained above in reference to FIGS. 1A and 1B, the frame 110 can be a base structure supporting the cabinet 140. However, in other embodiments, the cabinet 140 can be similarly supported from other structures by a frame in other orientations. For example, in some embodiments, the frame 110 can be configured to be mounted, for example, in a housing or cabinet, and/or on one or more side walls or ceiling thereof, to allow the cabinet 140 to rotate during operation as explained above.

The foregoing description of embodiments of the invention is not intended to be exhaustive or to limit the disclosed technology to the precise embodiments disclosed. While specific embodiments of, and examples for, the invention are described herein for illustrative purposes, various equivalent modifications are possible within the scope of the invention, as those of ordinary skill in the relevant art will recognize. For example, although certain functions may be described in the present disclosure in a particular order, in alternate embodiments these functions can be performed in a different order or substantially concurrently, without departing from the spirit or scope of the present disclosure. In addition, the teachings of the present disclosure can be applied to other systems, not only the representative popcorn machine devices and methods described herein. Further, various aspects of the invention described herein can be combined to provide yet other embodiments.

All of the references cited herein are incorporated in their entireties by reference. Accordingly, aspects of the invention can be modified, if necessary or desirable, to employ the systems, functions, and concepts of the cited references to provide yet further embodiments of the disclosure. These and other changes can be made to the invention in light of the above-detailed description. In general, the terms used in the following claims should not be construed to limit the invention to the specific embodiments disclosed in the specification, unless the above-detailed description explicitly defines such terms. Accordingly, the actual scope of the disclosure encompasses the disclosed embodiments and all equivalent ways of practicing or implementing the disclosure under the claims.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

From the foregoing, it will be appreciated that specific embodiments of the disclosed technology have been described herein for purposes of illustration, but that various modifications may be made without deviating from the invention. Certain aspects of the disclosure described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the disclosed technology. Accordingly, the disclosure and associated technology can encompass other embodiments not expressly shown or described herein. The invention is not limited, except as by the claims.

The invention claimed is:

1. A popcorn machine, comprising:
   a cabinet including an upper panel, a lower panel, a first sidewall, and a second sidewall opposite the first sidewall;
   a perforated receptacle proximate the upper panel, wherein the perforated receptacle is configured receive unpopped corn kernels;
   a cover assembly attached to the upper panel over the perforated receptacle, wherein the cover assembly includes an opening configured to allow popped corn kernels to exit the machine therethrough;
   a frame, wherein the frame includes a first support structure pivotally coupled to the first sidewall and a second support structure pivotally coupled to the second sidewall, whereby the cabinet is pivotally positioned above a floor to define a space therebetween, and wherein the frame allows the cabinet to rotate relative to the first and second support structures to move the cover assembly from a first height above the floor to a second height, less than the first height, above the floor to facilitate movement of popcorn out of the machine through the opening;
   a bumper extending from the cabinet proximate the lower panel, wherein the bumper is configured to contact the frame when the cover assembly is at the first height, whereby movement of the cover assembly from the first height toward the second height causes corresponding movement of the bumper away from the frame;
   a heat source; and
   a fan configured to move air past the heat source and through the perforated receptacle to pop the corn kernels therein.

2. The popcorn machine of claim 1 wherein the fan is configured to move air past the heat source and through the perforated receptacle to pop the corn kernels in the absence of cooking oil.

3. The popcorn machine of claim 1, further comprising an air intake regulator disposed on an inlet portion of the cabinet, wherein the air intake regulator is configured to regulate an amount of air flowing into an interior cavity of the cabinet.

4. The popcorn machine of claim 1, further comprising:
   a cover duct positioned between the cabinet and the cover assembly; and
   a recirculation duct configured to draw air from the cover duct into an interior cavity of the cabinet.

5. The popcorn machine of claim 1 wherein the heat source includes a heating element having a plurality of coils configured to produce heat when electric current is applied therethrough.

6. The popcorn machine of claim 3 wherein the air intake regulator comprises a rotatable disc having a plurality of apertures.

7. The popcorn machine of claim 1 wherein the cabinet has a height of approximately 15 inches or greater.

8. A popcorn machine, comprising:
   a cabinet including an upper panel having a first opening, a first sidewall, and a second sidewall opposite the first sidewall;

a receptacle extending downward from the first opening, wherein the receptacle is configured to receive unpopped corn kernels therein;

a cover assembly attached to the upper panel over the first opening, wherein the cover assembly includes
  a second opening configured to allow popped corn kernels to exit the machine therethrough; and
  a first duct extending from the first opening to the second opening;

a frame, wherein the frame includes a first support structure pivotally coupled to the first sidewall and a second support structure pivotally coupled to the second sidewall, whereby the cabinet is pivotally positioned above a floor to define a space therebetween, and wherein the frame allows the cabinet to rotate relative to the first and second support structures to move the cover assembly from a first height above the floor to a second height, less than the first height, above the floor to facilitate the exit of the popped corn kernels through the second opening;

a heat source;

an air inlet disposed on a rear panel of the cabinet;

a first fan housed in an interior cavity of the cabinet and configured to move air from the air inlet past the heat source and through the receptacle to pop the corn kernels therein;

a second duct configured to transfer air from the first duct into the interior cavity of the cabinet; and a second fan configured to draw air through the second duct.

9. The popcorn machine of claim 8 wherein the corn kernels are popped in the absence of cooking oil.

10. The popcorn machine of claim 8, further comprising a handle attached to the cabinet, wherein the frame allows the cabinet to rotate in response to a downward force applied to the handle.

11. The popcorn machine of claim 8, further comprising an air inlet regulator disposed on the air inlet and configured to regulate an amount of air flowing into the interior cavity.

12. The popcorn machine of claim 11 wherein the air inlet regulator comprises a rotatable disc having a plurality of apertures.

13. The popcorn machine of claim 8, further comprising a control unit operably coupled to the cabinet, wherein the control unit is configured to regulate the flow of electric current to the heat source, and wherein the control unit includes a control panel configured to receive user input and display temperature information to a user.

14. The popcorn machine of claim 8 wherein the heat source includes a heating element having a plurality of coils configured to produce heat when electric current is applied therethrough.

15. The popcorn machine of claim 8 wherein the heat source is configured to heat air to a temperature between 400 and 460 degrees Fahrenheit.

16. The popcorn machine of claim 8 wherein the second duct extends outside the cabinet from the first duct to the air inlet.

17. The popcorn machine of claim 8 wherein the second fan is disposed in the second duct.

18. The popcorn machine of claim 4 wherein the fan is a first fan, and wherein air heated by the heat source escapes the cabinet through the cover assembly, and further comprising a second fan configured to draw a portion of the heated air escaping the cabinet into the recirculation duct.

19. The popcorn machine of claim 18 wherein the second fan is disposed in the recirculation duct.

20. The popcorn machine of claim 1 wherein the receptacle, the upper panel, the lower panel, the first sidewall and the second sidewall at least partially define an interior cavity of the cabinet, and wherein the receptacle is configured to receive the unpopped kernels therein outside the interior cavity of the cabinet.

21. The popcorn machine of claim 1 wherein the cover assembly includes a lid portion and a shield pivotally attached from the lid portion.

22. The popcorn machine of claim 1 wherein the frame includes a crossbar extending at least partially between the first support structure and the second support structure, and wherein the bumper is configured to contact the crossbar when the cover assembly is at the first height.

* * * * *